United States Patent
Caves et al.

(10) Patent No.: US 7,596,693 B1
(45) Date of Patent: Sep. 29, 2009

(54) CONTROLLING ARP PACKET TRAFFIC TO ENHANCE NETWORK SECURITY AND SCALABILITY IN TCP/IP NETWORKS

(75) Inventors: Evan John Caves, Santa Barbara, CA (US); Henri Altarac, Santa Barbara, CA (US); Koral Ilgun, Nevada City, CA (US)

(73) Assignee: Occam Networks, Santa Barbara, CA (US)

( * ) Notice: Subject to any disclaimer, the term of this patent is extended or adjusted under 35 U.S.C. 154(b) by 0 days.

(21) Appl. No.: 11/591,620

(22) Filed: Oct. 31, 2006

Related U.S. Application Data

(62) Division of application No. 10/388,251, filed on Mar. 12, 2003.

(51) Int. Cl.
H04L 29/06 (2006.01)
(52) U.S. Cl. ...................................... 713/161
(58) Field of Classification Search ................ 713/161
See application file for complete search history.

(56) References Cited

U.S. PATENT DOCUMENTS

| | | | |
|---|---|---|---|
| 6,717,944 B1 | 4/2004 | Bryden et al. | |
| 6,847,649 B2 | 1/2005 | Sutanto | |
| 2001/0042200 A1 | 11/2001 | Lamberton et al. | |
| 2002/0010869 A1 | 1/2002 | Kim | |
| 2003/0037163 A1 | 2/2003 | Kitada et al. | |
| 2003/0043853 A1* | 3/2003 | Doyle et al. | 370/489 |
| 2003/0152067 A1 | 8/2003 | Richmond et al. | |

OTHER PUBLICATIONS

David C. Plummer, "An Ethernet Address Resolution Protocol or Converting Network Protocol Addresses to 48 bit Ethernet Address for Transmission on Ethernet Hardware," RFC 826, pp. 1-10 (Nov. 1982).
P. Ferguson, et al., "Network Ingress Filtering: Defeating Denial of Service Attack which employ IP Source Address Spoofing," RFC 2827, pp. 1-10 (May 2000).
M. Patrick, "DHCP Relay Agent Information Option," RFC 3046, pp. 1-14 (Jan. 2001).
Wikipedia, "Address Resolution Protocol", 4 pages, Downloaded Jun. 13, 2007 from http://en.wikipedia.org/wiki/Address_Resolution_Protocol.
Computer Dictionary, "ARP (Address Resolution Protocol)," Microsoft Press, 3rd Edition, p. 30 (1997).

* cited by examiner

*Primary Examiner*—Jacob Lipman
(74) *Attorney, Agent, or Firm*—Blakely, Sokoloff, Taylor & Zafman LLP

(57) ABSTRACT

A method of preventing ARP broadcast flooding of subscriber access links where an ARP packet is received at a subscriber network edge device and the source and destination information contained within the ARP packet is compared to address lease information for subscribers of a subscriber network. If the destination information obtained from the ARP packet is not associated with an address lease assigned to one of the subscribers, the network device only broadcasts the ARP packet to network uplinks. The method further includes preventing subscribers of a subscriber network from spoofing ARP responses by responding to an ARP request packet with an ARP response packet containing false information. The ARP response packet information is compared to address lease information for the transmitting subscriber. If the source information obtained from the ARP response packet corresponds to address lease information of the transmitting subscriber the ARP response packet is accordingly forwarded.

15 Claims, 7 Drawing Sheets

ARP Packet

400

| | 402 | 404 | 406 |
|---|---|---|---|
| 408 | Port 1 | MAC Address 1 | IP Address 1 |
| | Port 2 | MAC Address 2 | IP Address 2 |
| | ... | ... | ... |
| | ... | ... | ... |
| | Port n | MAC Address n | IP Address n |

Figure 4

CONTROLLING ARP PACKET TRAFFIC TO ENHANCE NETWORK SECURITY AND SCALABILITY IN TCP/IP NETWORKS

The present application is a divisional of U.S. patent application Ser. No. 10/388,251, filed Mar. 12, 2003.

FIELD OF THE INVENTION

The present invention relates to the field of network security and scalability. More specifically, the invention relates to a method and device for controlling ARP traffic to enhance network security and scalability.

BACKGROUND

Communication is the cornerstone of business and personal relationships. Today, people in offices and homes do a great deal of communicating over computer networks and expect such communication to be reliable and their data secure. Therefore, network security has become a major concern for Internet Service Providers (ISPs) and company network administrators. Network security seeks to prevent hackers from attacking a network and disrupting the flow of communication, productivity, and overall service.

Hacker is a slang term used to refer to individuals who attack or gain unauthorized access to computer systems for the purpose of manipulating and/or stealing data and/or disrupting the flow of data in and out of a network. Hacking can occur from within or from outside the network being hacked.

Two common objectives of a network attack are to obtain access to data and to deny service to authorized users. Firewalls are frequently used to prevent unauthorized Internet users from accessing data on networks connected to the Internet. Firewalls can be implemented in both hardware and software, or a combination of both. All packets entering or leaving the network pass through the firewall, which examines each packet and blocks those that do not meet the specified security criteria. However, firewalls do not prevent denial of service attacks created by broadcast storms.

Broadcast traffic in a layer two network is sent out to every node on the network or a portion of the network. One typical use for a broadcast is for address resolution when the location of a user or server is not known. A broadcast flood is the transmission of broadcast traffic throughout an entire layer two network. A broadcast storm is an excessive amount of broadcast flooding. A broadcast storm can occur by chance, whereby a large number of users imitate one or more requests, or by a malicious attack where a hacker purposefully initiates valid or invalid requests to the network. Broadcasts may also occur when clients and servers come online and identify themselves. In all cases, the broadcast has to reach all possible stations that might potentially respond.

Broadcast storms are a recurring issue within many organization networks as broadcast traffic has increased with the growth, utility, and value of their networks. To understand why this is so, consider how network environments have changed with the advent of routers. A router is a layer three device that determines the next hop to which a packet should be forwarded toward its destination using layer three addresses, such as Internet Protocol (IP) addresses. The router is connected to at least two networks and decides which way to send each packet based on its current understanding of the state of the networks it is connected to. A switch is a layer two device that filters and forwards packets between Local Area Network (LAN) segments using layer two addresses, such as Media Access Control (MAC) addresses, and operates independently from layer three protocols (e.g., IP). Unlike a router or its functional equivalent, a switch does not require any knowledge of the network topology. In the case where no forwarding information is found in the forwarding database for a unicast packet whose destination is unknown, or the packet is a broadcast, the switch will flood the packet to all nodes or devices in the network in an effort to reach the destination device. A MAC address is a hardware address that uniquely identifies each node or device on a network.

FIG. 1 shows Address Resolution Protocol (ARP) packet protocol fields. The protocol address space 102 specifies the type of protocol or packet type, such as IP. The operation code 104 specifies whether the packet is an ARP request packet or an ARP reply packet. The hardware address of the sender 106 and the protocol address of the sender 108 are the sender's MAC address and IP address, respectively. An IP address is an identifier for a computer or device on a Transmission Control Protocol/Internet Protocol (TCP/IP) network. Networks using the TCP/IP protocols route packets based on the IP address of the destination. The protocol address of the target 112 is the destination IP address of the machine the sender is trying to contact. Because the purpose of an ARP request packet is to resolve the target MAC address, the hardware address of the target 110 is undefined in a request packet and would only be defined in an ARP response packet.

FIG. 2 shows a conventional method of dealing with broadcast/unicast flooding in an effort to limit broadcast storm damage to a network. A network device, such as a switch, will set rising and falling threshold parameters (step 202) for the number of flooded broadcast/unicast packets the device may receive. The network device receives a packet to flood (e.g., broadcast or unknown unicast) (step 204) and checks to see if the number of requests has exceeded the rising threshold parameter (step 206). If the number of requests has not exceeded the rising threshold parameter, the device floods the request to all network ports (step 208) and continues to receive new requests (step 204). If the rising threshold parameter has been exceeded, the device does not flood the packet (step 210) but checks to see if the number of requests has fallen below the falling threshold parameter (step 212). The device will continue to ignore further requests (step 210) as long as the number of requests is above the falling threshold parameter. When the number of requests falls below the falling threshold parameter, the device again continues to flood requests (step 204). This solution, however, is inadequate because although it may shorten the time interval of the flood, there is still a denial of service while the threshold parameters are exceeded and the method fails to deal with the issue of flooding broadcast packets to all nodes.

Another problem that arises in connection with ARP traffic is ARP response spoofing. This occurs when a hacker fakes a response to an ARP request. In such cases the IP host/router, which sent the ARP request, will associate the target IP address with the MAC address belonging to the malicious user. The result is that traffic intended for a legitimate user will be forwarded to the malicious user, thus compromising security and denying service to the sender and intended receiver.

SUMMARY OF THE INVENTION

A network edge device is used to limit the scope of flooding ARP broadcast packets to a subset of network interfaces and to prevent subscribers from spoofing ARP responses by using source and destination information contained within the ARP packets and address lease information of subscribers. In one embodiment of the present invention, a packet is received at a subscriber network edge device and destination information contained within the packet is compared to address lease information for subscribers of a subscriber network. The packets are broadcast to network uplinks only if the destination information obtained from the network packet is not associated with an address lease assigned to one of the subscribers. If the packet is associated with one of the subscribers in the address lease database then it is forwarded only on that subscriber port.

In another embodiment of the present invention, the network edge device broadcasts an ARP request packet to subscriber access links and receives from a subscriber of the subscriber network an ARP response packet. The ARP response packet source information is compared to address lease information for the responding subscriber. If the source information obtained from the ARP response packet corresponds to address lease information of the responding subscriber, the ARP response packet is considered legitimate and the ARP response packet is accordingly forwarded. If the lease information does not correspond to the ARP response packet source information, the ARP response packet is discarded and an alarm generated and relayed to a network administrator.

BRIEF DESCRIPTION OF THE DRAWINGS

FIG. 4 is an example of a database table containing address lease information according to an embodiment of the present invention.

DETAILED DESCRIPTION OF THE INVENTION

Figure 1:
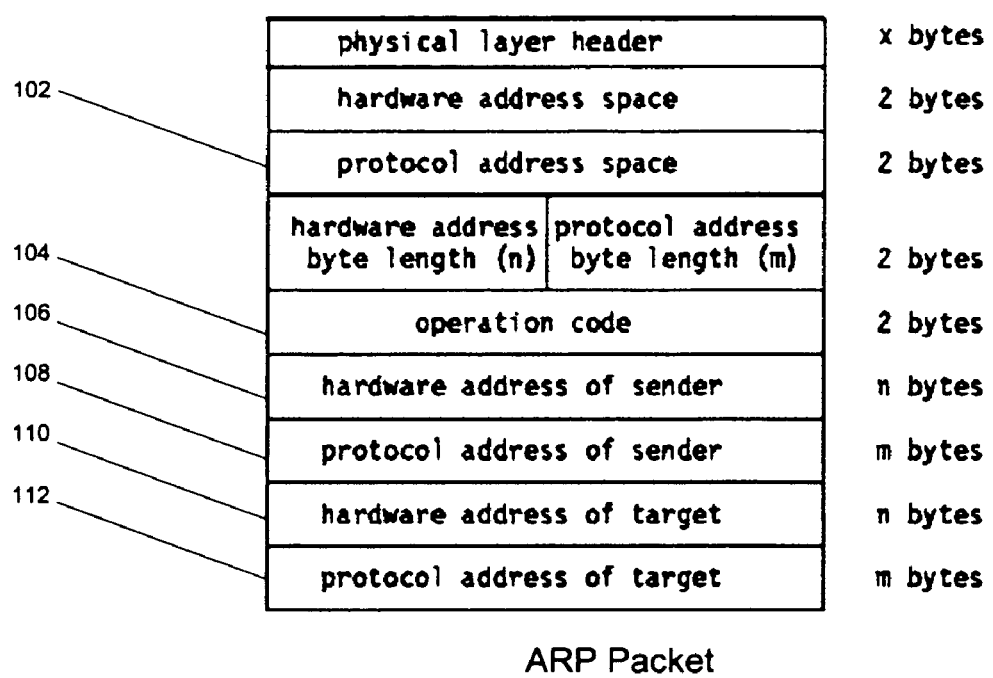
FIG. 1 shows an ARP packet protocol fields.
Figure 2:
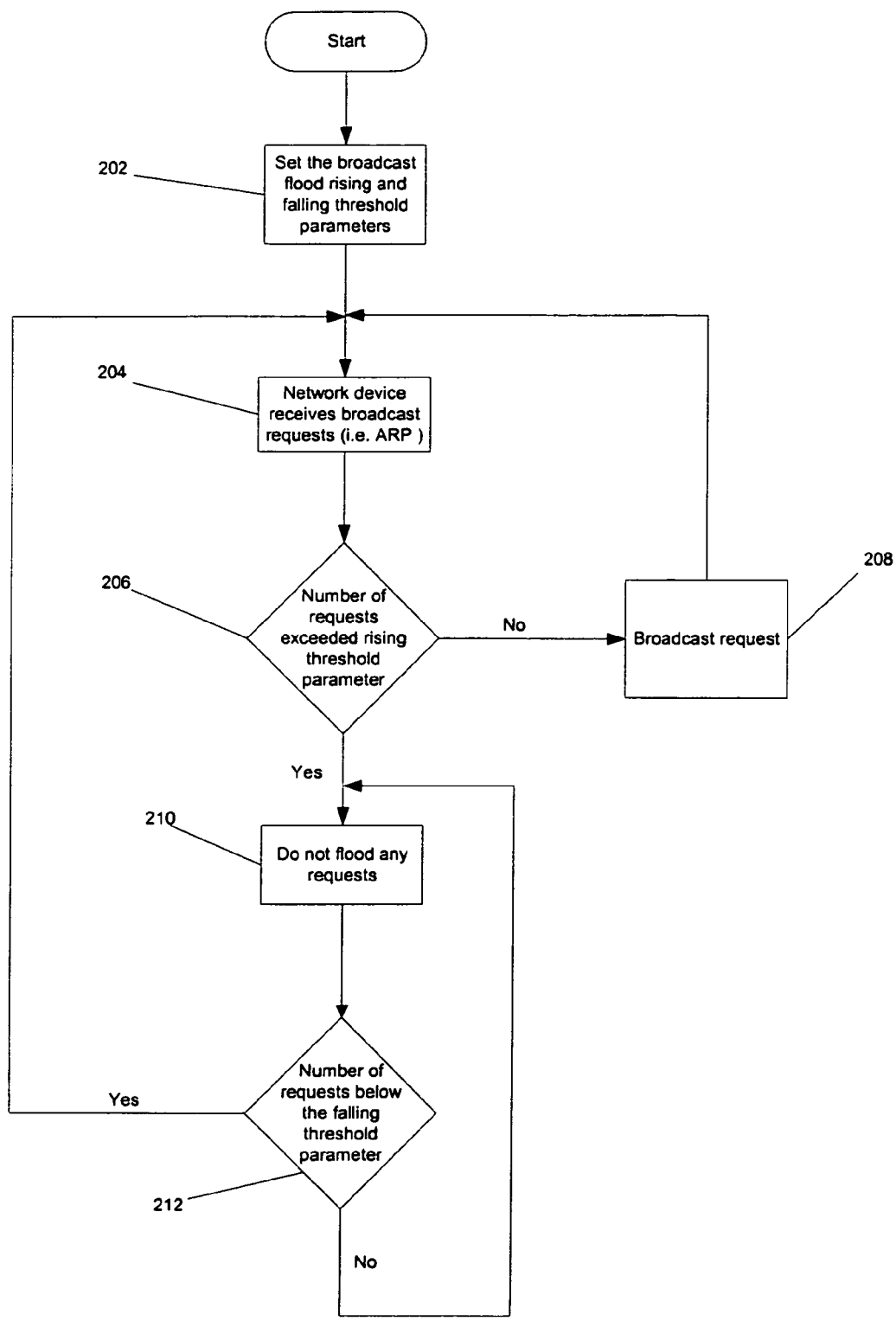
FIG. 2 shows a conventional method of dealing with broadcast/unicast flooding in an effort to limit broadcast storm damage to the network.
Figure 3:
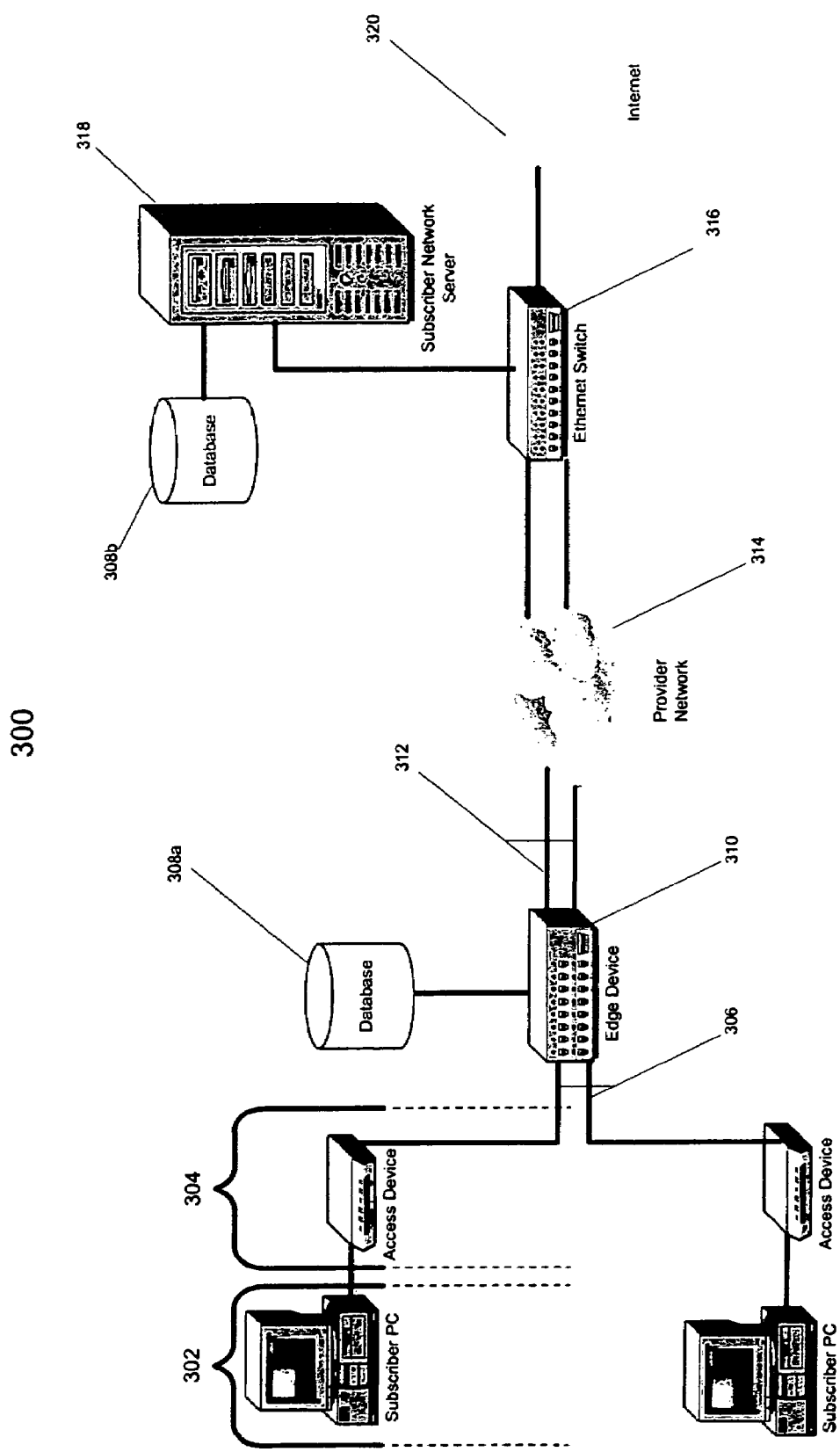
FIG. 3 illustrates a subscriber network including an edge device where an embodiment of the present invention resides.

FIG. 3 illustrates a subscriber network 300 including subscriber Personal Computers (PCs) 302 and their connectivity to the Internet 320. Subscriber PCs 302 transmit IP traffic destined for the Internet 320 through corresponding access devices 304 and up the subscriber access links 306 to the edge device 310. In varying embodiments, access device 304 is a modem that contains an interworking function that primarily bridges Ethernet frames to the access link technology, which could be DSL, cable, or a dial-up modem. The other devices connected to the Ethernet segment, such as subscriber PC's 302, are the devices that originate the IP traffic. After receiving data from the access devices 304 through subscriber links 306, the edge device 310 then forwards the IP traffic along network uplinks 312, through the provider network 314 and the Ethernet switch/router 316 to the Internet 320. Traffic that originates from a subscriber PC 302 destined for another one of the subscriber PCs 302 is filtered at edge device 310 and forwarded down the appropriate subscriber access link 306 associated with the destination subscriber PC 302.

The edge device 310 contains software and hardware for executing the method of the present invention including functions relating to managing subscriber IP leases and filtering incoming IP traffic. The edge device includes network ports associated with subscriber links 306 and network uplinks 312. In one embodiment, the edge device 310 is a switch configured to execute the method of the present invention.

In one embodiment of the present invention ARP traffic is controlled by comparing destination information contained within an ARP request packet received at the edge device 310 to address lease information for subscriber PCs 302. If the destination information obtained from the ARP request packet is found in the address lease database 308 it is forwarded to the port (subscriber access link 306) of the subscriber associated with the database entry except on the port the ARP request packet was received. If the destination information obtained from the ARP request packet is not associated with address lease information of one of the subscribers, the ARP request packet is flooded only to network uplinks 312 except on the originating uplink if applicable.

In another embodiment, the network edge device 310 receives an ARP request or response packet from one of the subscriber PCs 302. The packet source information, specifically the source MAC and IP address, is compared to the address lease information for the originating subscriber PC 302. If the address lease information corresponds to the originating subscriber PC 302 the packet is forwarded accordingly.

In an exemplary embodiment, the hardware in edge device 310 is any Ethernet switching chip including supporting components known in the art. In other embodiments, the edge device may be based on an Application Specific Integrated Circuit (ASIC) configured to execute the present methods or on a suitably programmed PC or similar computer.

The database 308 includes subscriber information that is used by network devices, such as the edge device 310 and subscriber network server 318, to manage and maintain address leases. Subscriber information is made up of address lease information such as MAC addresses, their associated ports on the edge device, and subscriber IP addresses. In one embodiment, the database 308a is located at (or communicatively coupled with) the edge device 310. Alternatively, the database may be located at 308b and communicatively coupled to the subscriber network server 318. In this latter embodiment, the edge device 310 accesses the database 308b through the provider network 314. In another embodiment a plurality of databases, such as 308a and 308b, are configured such that each can serve as a backup for the other. The databases 308a or 308b can be located on any type of memory or storage device used in the art, such as DRAM, compact flash or a hard disk drive or any combination thereof.

The subscriber address lease information is used by the edge device 310 to manage address leases and control incoming ARP traffic. Static or dynamic IP address assignment determines when the address lease information is stored. For the static case, the address lease is assigned and the information stored when the fixed IP address is assigned. In the case of a dynamically assigned IP address, the address lease is assigned and the information stored each time a subscriber PC 302 negotiates a connection with the subscriber network server 318 or more specifically a Dynamic Host Configuration Protocol (DHCP) server.

FIG. 4 is an example of a database table 400 containing address lease information according to an embodiment of the present invention. Column 402 shows port 1 through port n, where n represents the number of ports of the edge device, each port corresponding to a subscriber access link as discussed above with respect to FIG. 3. Column 404 contains associated MAC addresses and column 406 contains IP addresses. An association is made for each element in every row. For example, in row 408, port 1 is associated with MAC address 1 and IP address 1. In one embodiment, the IP address is a static IP address and column 406, therefore, may be omitted. In other embodiments the database table 400 may include other subscriber information and/or statistics unrelated to the present invention.

Figure 5:
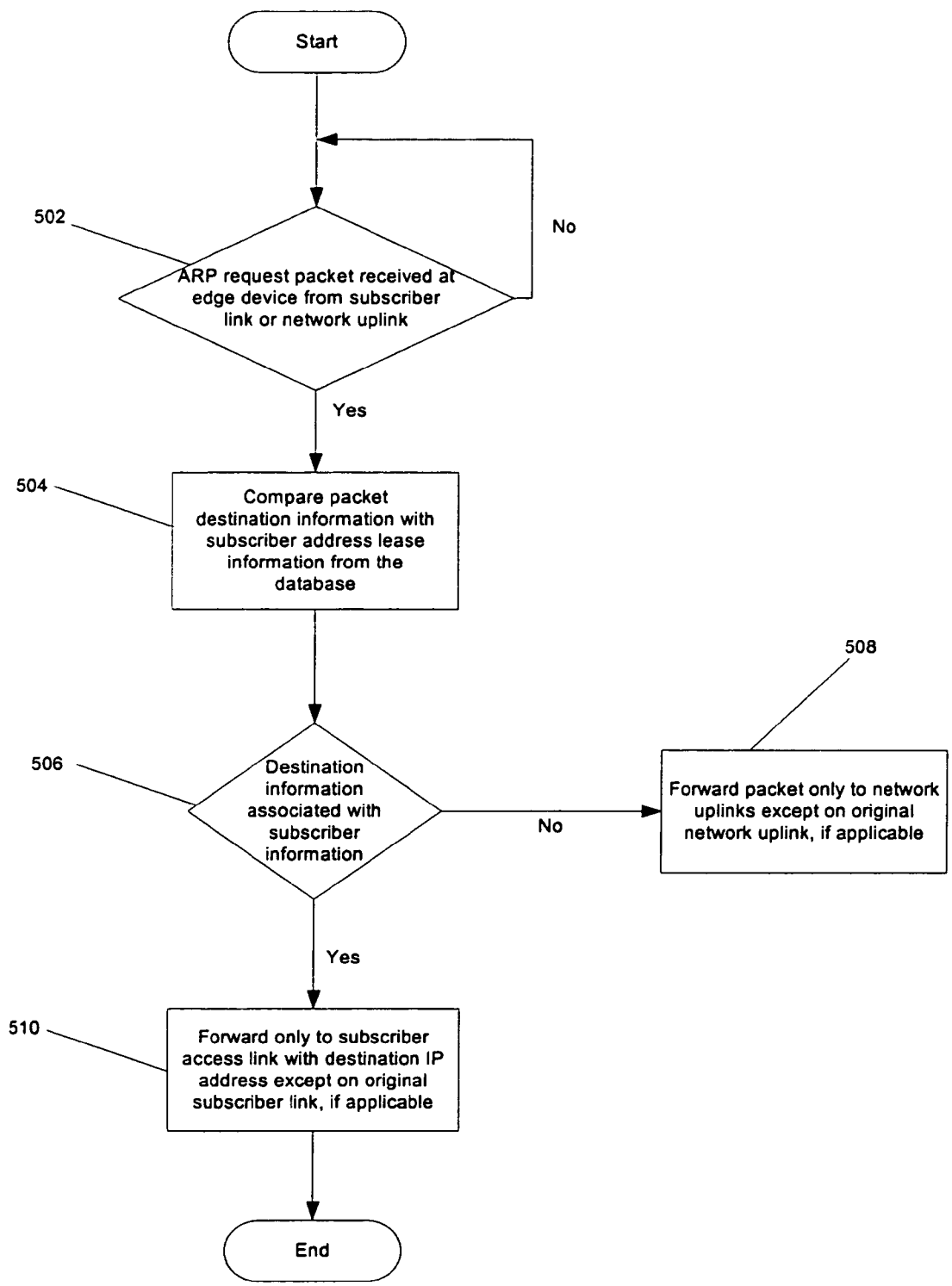
FIG. 5 illustrates one embodiment of the invention as executed in a network edge device configured to handle ARP request packets.

FIG. 5 illustrates a method of preventing ARP flooding in accordance with an embodiment of the invention as executed in a network edge device. Specifically, the flow diagram shows a method for handling ARP request packets. At the outset, an ARP request is received at the edge device from either a subscriber access link or a network uplink (step 502). Upon receiving the packet, the edge device extracts the destination information from the packet and compares the information to the subscriber address lease information from the database (step 504). If the destination information is not associated with any one of the users on the subscriber network (step 506), the packet is forwarded only to the edge device network uplinks except on originating uplink, if applicable (step 508). If the destination information is associated with the subscriber address lease information, the packet is forwarded only to the subscriber access link associated with the extracted destination information except on originating subscriber access link, if applicable (step 510).

Figure 6:
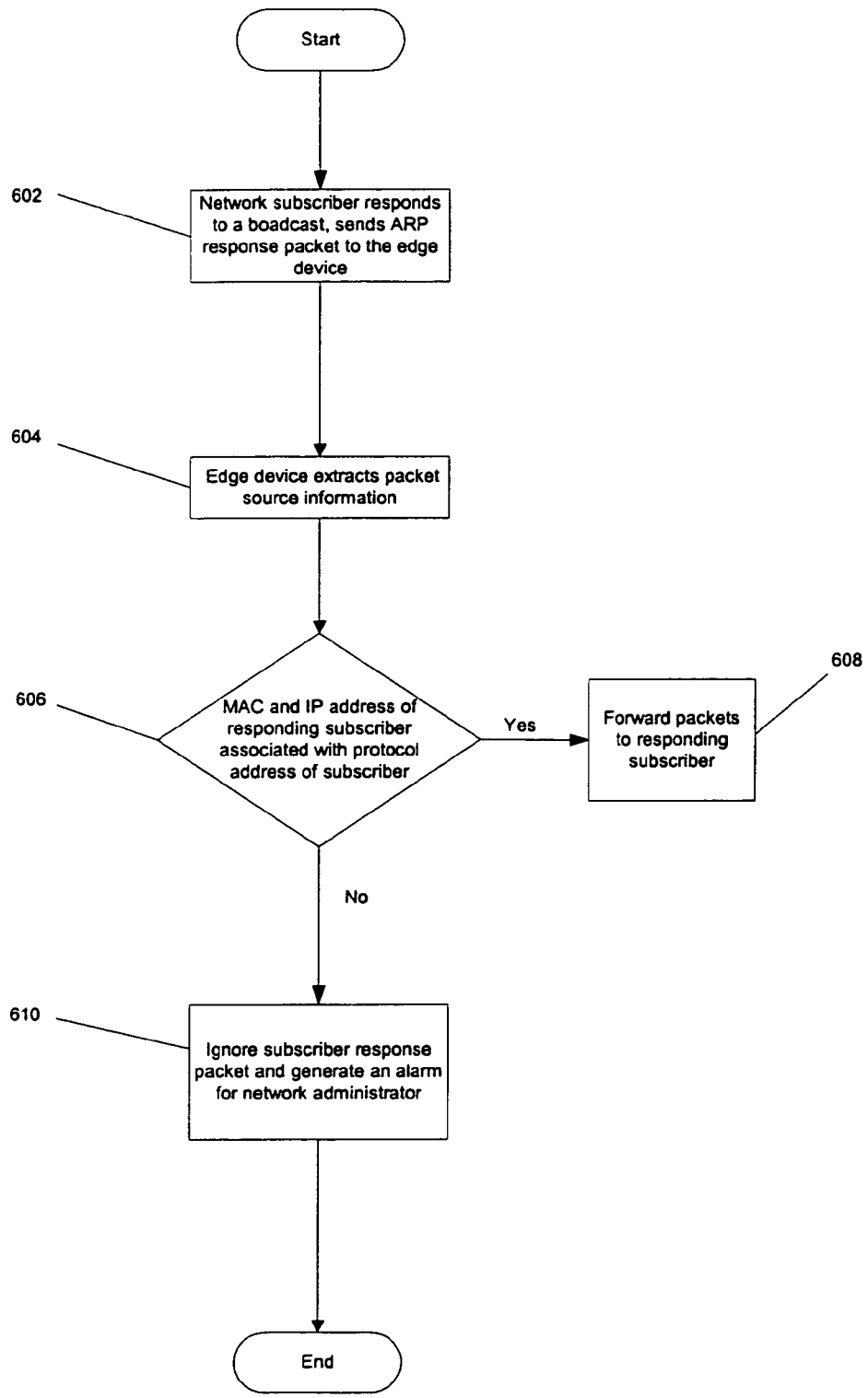
FIG. 6 is a flow chart illustrating how one embodiment of the invention handles ARP response packets from network subscribers.

FIG. 6 is a flow chart illustrating an embodiment of the invention handling ARP response packets from network subscribers. In one embodiment, an edge device (e.g. 310) broadcasts an ARP request packet down subscriber access links and a subscriber responds with an ARP response packet (step 602). In another embodiment, a subscriber sends an unsolicited ARP response packet to the edge device (step 602). In either case, the edge device extracts the packet source information including the source hardware address (MAC) and the source protocol address (IP) (step 604). The edge device accesses the subscriber database (e.g., 308) to verify the responding subscriber MAC is associated with the subscriber's IP address (step 606). If the MAC address of the responding subscriber is associated with the subscriber's IP address, the ARP packet is forwarded (step 608). If the MAC address of the responding subscriber is not associated with the subscriber's IP address, the edge device ignores the ARP response packet and generates an alarm to a network administrator (step 608).

Thus as illustrated in FIG. 5, in various embodiments of the present invention for preventing ARP broadcast flood of subscriber access links, a network edge device receives an ARP packet and compares destination information contained within the ARP request packet to address lease information for subscribers of a subscriber network. Consequently, the ARP request packets are only broadcast on network uplinks coupled to the network edge device if the destination information obtained from the ARP request packet is not associated with address lease information of at least one of the subscribers. If the destination information is associated with any of the subscriber address lease information, the ARP request packet is forwarded to a subscriber link connected to the network edge device. Further, the ARP request packet is discarded if the destination IP address of the ARP request packet corresponds to address lease information of the transmitting subscriber or if the source MAC and IP address do not match the transmitting subscriber's address lease information.

When a provider assigns a static or dynamic IP address to a user, the address lease information associated with the user is stored in a database accessible by the network edge device. In various embodiments of the present invention, the address lease information includes, for each subscriber, an Internet Protocol (IP) address, a Media Access Control (MAC) address, and a port. ARP traffic received at the network edge device 310 of FIG. 3 includes destination information such as, destination IP address and destination MAC address.

In one embodiment of the present invention, the device for preventing ARP broadcast flooding of subscriber access links has at least one subscriber network port for transmitting and receiving network packets, including ARP request packets, to and from a subscriber network and at least one provider network port coupled to the subscriber network port for transmitting and receiving network packets, including ARP request packets, to and from a provider network.

In any embodiment of the present invention, a means is required for comparing destination information contained within the ARP request packets to address lease information of subscribers. The address lease information of the subscribers is stored in a database accessible by the edge device. The device will broadcast only on the provider network ports, or network uplinks, if the destination information obtained from the ARP request packets is not associated with the address lease information assigned to any of the subscribers. Further, the device will only forward ARP request packets to a subscriber link if the destination information is associated with any of the subscribers' address lease information.

In another embodiment of the present invention, a device is used for preventing a first subscriber of a subscriber network from receiving data packets intended for another subscriber of the subscriber network by spoofing an ARP response packet containing the other subscriber's source information. The device has at least one first network port coupled to the network device for transmitting and receiving network packets, including ARP response packets, to and from a subscriber network. The device further includes at least one second network port coupled to the first network port, the second network port for transmitting and receiving network packets, including ARP response packets, to and from a provider network.

In any embodiment of the present invention, a means is required for broadcasting an ARP request packet from a network device to subscriber access links coupled to the subscriber access network and receiving an ARP response packet from a responding subscriber of the subscriber network. The means further includes comparing packet source information contained within the ARP response packet to address lease information for the responding subscriber, and forwarding the packet to the requesting subscriber only if the source information obtained from the ARP response packet corresponds to address lease information of the responding subscriber.

As illustrated in FIG. 6, in various embodiments of the present invention for preventing subscribers of a subscriber network from spoofing ARP responses, a network edge device forwards an ARP request packet to at most one subscriber access link and receives from a subscriber of the subscriber network an ARP response packet. The ARP response packet source information is compared to address lease information for the responding subscriber. If the source information obtained from the ARP response packet corresponds to address lease information of the responding subscriber the ARP response packet is accordingly forwarded.

As illustrated above, the present invention may be implemented on a network edge device, such as edge device 310 shown in FIG. 3. When the edge device includes a general or special purpose processor, the present invention may be implemented as computer software (e.g. stored on a hard disk or other machine-readable medium) such that when executed by the processor a method of the invention is performed. This method performed includes receiving an ARP packet at the subscriber network edge device, comparing destination information contained within the ARP packet to address lease information of subscribers, and broadcasting on network uplinks coupled to the network edge device, only if the destination information obtained from the ARP packet is not associated with address lease information of at least one of the subscribers. The method further includes, forwarding the ARP packet to a subscriber link if the destination information is associated with any of the subscriber address lease information.

Figure 7:
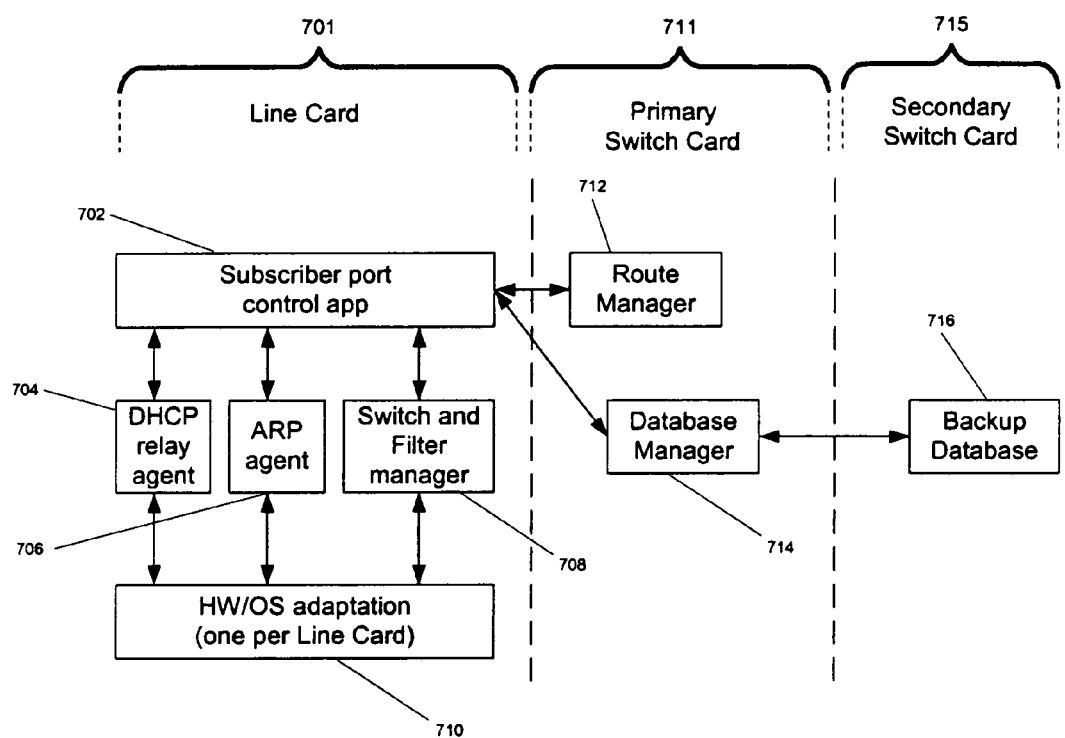
FIG. 7 illustrates a high-level software architecture for one embodiment of the present invention.

FIG. 7 illustrates a high-level software architecture 700 for an exemplary embodiment of the present invention. As shown in 700, the software architecture is distributed among three components, the line card 701, the primary switch card 711, and the secondary switch card 715. In one embodiment, the components reside in a network device such as the edge device described above. The line card 701 includes the subscriber port controller application 702, the Dynamic Host Configuration Protocol (DHCP) relay/snooping agent 704, the ARP agent 706, the switch and filter manager 708, and the hardware operating system adaptation (HW/OS) module 710. The primary switch card 711 includes the route manager 712 and the database manager 714. The secondary switch card 715 contains the backup database 716. In other embodiments the software architecture can be implemented on various devices capable of executing machine instructions, such as an Application Specific Integrated Circuit (ASIC) or network server.

The first line card component is the subscriber port control application 702. This application keeps the state of the various leases and interprets the lease grants and releases. The subscriber port control application 702 interacts with the route manager 712 on the primary switch card 711 and with the database manager 714. On restart, it extracts the last known set of leases from the database manager 714 and attempts to reinstall the leases and switch entries and routes.

The DHCP relay agent 704 implements the DHCP protocol and signals all changes to leases to the subscriber port controller 702. The ARP agent 706 interprets ARP request and response packets, and determines on which specific ports or links (if any) they should be forwarded based on address lease information as illustrated in the method discussed above with respect to FIGS. 5 and 6. This method replaces the conventional method of broadcasting to all ports or links, or halting all broadcasts when a threshold level is exceeded as discussed previously. Further, network security is enhanced by verifying source information for all ARP packets received from subscribers.

A switch and filter manager 708 is an Application Program Interface (API) used to create or delete static database entries and manage ingress filters. The hardware and operating system adaptation module 710 is unique to each line card and provides a mechanism to set up filters and packet handlers. For example, an Asymmetric Digital Subscriber Line (ADSL) card will have a software implementation while a Very-high-bit-rate Digital Subscriber Line (VDSL) card may require hardware assistance.

The first software component of primary switch card 711 is the route manager 712. The route manager 712 uses a control interface to create and delete routes. The database manager 714 ensures that database records are replicated to the backup switch card 715 and both databases are kept in persistent storage.

The secondary switch card 715 includes the backup database 716. The backup database 716 is controlled by the database manager 714 and is utilized in the event the primary database is compromised.

In the foregoing specification, the invention has been described with reference to specific embodiments. It will, however, be evident that various modifications and changes can be made without departing from the broader spirit and scope of the invention as set forth in the appended claims. The specification and drawings are, accordingly, to be regarded in an illustrative rather than a restrictive sense.

What is claimed:

1. A method of preventing a first subscriber of a subscriber network from receiving data packets intended for another subscriber of the subscriber network by spoofing an Address Resolution Protocol (ARP) response packet, the method comprising:

forwarding from a network edge device an ARP request packet to at least one subscriber access link;

receiving at the network edge device the ARP response packet from a responding subscriber, wherein the ARP response packet includes a packet source information;

comparing the packet source information that includes a source Internet Protocol (IP) address and a source Media Access Control (MAC) address contained within the ARP response packet to an address lease information for the responding subscriber from a database of subscribers that includes an Internet Protocol (IP) address of a subscriber, a Media Access Control (MAC) address of the subscriber, and a port of the network edge device corresponding to the subscriber, wherein the comparing includes determining whether the source IP address and the source MAC address match the address lease information;

determining on which port of the network edge device to forward the ARP response packet based on the address lease information; and forwarding the ARP response packet on the determined port of the network device only if the source information obtained from the ARP response packet corresponds to the address lease information of the responding subscriber.

2. The method of claim 1, wherein the address lease information is stored in a database each time when the IP address is assigned to the subscriber.

3. The method of claim 1, wherein the address lease information is obtained via a Dynamic Host Configuration Protocol (DHCP) relay/snooping.

4. The method of claim 1, wherein the address lease information is statistically configured by a network administrator.

5. The method of claim 1, wherein before receiving an ARP packet the address lease information is stored in the database accessible by the network edge device.

6. The method of claim 1, wherein if the source information obtained from the ARP response packet does not correspond to address lease information of the transmitting subscriber, the ARP response packet is discarded.

7. The method of claim 6, wherein after the ARP response packet is discarded an alarm is generated and relayed to a network administrator.

8. A network device for preventing a first subscriber of a subscriber network from receiving data packets intended for another subscriber of the subscriber network by spoofing an ARP response packet, the network device comprising:

at least one first network port coupled to the network device for transmitting and receiving network packets, including Address Resolution Protocol (ARP) response packets, to and from a subscriber network;

at least one second network port coupled to the first network port, the second network port for transmitting and receiving network packets, including ARP response packets, to and from a provider network;

means for forwarding from the network device an ARP request packet to at least one subscriber access link coupled to the subscriber access network and receiving the ARP response packet from a responding subscriber of the subscriber network, wherein the ARP response packet includes a packet source information;

means for comparing the packet source information that includes source Internet Protocol (IP) address and a source Media Access Control (MAC) address contained within the ARP response packet to address lease information for the responding subscriber from a database of subscribers that includes an Internet Protocol (IP) address of the subscriber, a Media Access Control (MAC) address of the subscriber, and a port on the network device corresponding to the subscriber, wherein the means for comparing includes determining whether the source IP address, the MAC address and the subscriber port on the network device that received the ARP response match the address lease information;

means for determining on which port of the at least one of the first network port and the second network port to forward the ARP response packet based on the address lease information; and means for forwarding the ARP response packet on the determined at least one of the first network port and the second network only if the source information obtained from the ARP response packet corresponds to the address lease information of the responding subscriber.

9. The network device of claim 8, wherein the address lease information is obtained via means for a Dynamic Host Configuration Protocol (DHCP) relay/snooping.

10. The network device of claim 8, wherein the address lease information is statistically configured by a network administrator.

11. The network device of claim 8, further comprising:
means for storing the address lease information in the database accessible by the means for comparing.

12. The network device of claim 8, further comprising:
means for discarding the ARP response packet if the source information obtained from the ARP response packet does not correspond to address lease information of the responding subscriber.

13. A machine readable medium having embodied thereon an instruction set, the instruction set being executable by a machine to perform a method, the method comprising:

forwarding from a network edge device an ARP request packet to at least one subscriber access link;

receiving an Address Resolution Protocol (ARP) response packet from a transmitting subscriber, wherein the ARP response packet includes a packet source information;

comparing the packet source information contained within the ARP response packet that includes source Internet Protocol (IP) address and a source Media Access Control (MAC) address to an address lease information for the responding subscriber from a database of subscribers that includes an Internet Protocol (IP) address of a subscriber, a Media Access Control (MAC) address of the subscriber, and a port on the network device corresponding to the subscriber, wherein the comparing includes determining whether the source IP address, the source MAC address, and the port on the network device that received the ARP response match the address lease information;

determining on which port of the network edge device to forward the ARP response packet based on the address lease information;

forwarding the ARP response packet on the determined port of the network edge device only if the source information obtained from the ARP response packet corresponds to the address lease information of the responding subscriber.

14. The machine-readable medium of claim 13, wherein the address lease information is obtained via a Dynamic Host Configuration Protocol (DHCP) relay/snooping.

15. The machine-readable medium of claim 13, wherein the address lease information is statistically configured by a network administrator.

* * * * *